April 22, 1930.    P. P. DEAN    1,755,432
PORTABLE VALVE OPERATING MECHANISM
Filed Aug. 9, 1922    3 Sheets-Sheet 1

INVENTOR.
Peter P. Dean
BY
ATTORNEY.

April 22, 1930.    P. P. DEAN    1,755,432
PORTABLE VALVE OPERATING MECHANISM
Filed Aug. 9, 1922    3 Sheets-Sheet 3

INVENTOR.
Peter P. Dean
BY
ATTORNEY.

Patented Apr. 22, 1930

1,755,432

UNITED STATES PATENT OFFICE

PETER P. DEAN, OF STAMFORD, CONNECTICUT, ASSIGNOR, BY MESNE ASSIGNMENTS, TO CUTLER-HAMMER, INC., A CORPORATION OF DELAWARE

PORTABLE VALVE-OPERATING MECHANISM

Application filed August 9, 1922. Serial No. 580,694.

This invention relates to portable valve operating mechanisms and particularly to such mechanisms designed for installation on motor trucks to be driven by the motors thereof.

In my prior Patent No. 1,536,081, dated May 5, 1925, there is disclosed one form of mechanism for such application and the present invention has among its objects to improve thereon while preserving the advantageous features thereof including means to afford automatic stopping upon operation of the controlled valve to the desired degree.

Another object of the invention is to provide a mechanism having improved driving connections to afford drive thereof from the motor of the vehicle upon which it is mounted.

Another object is to provide a mechanism having driving connections adapting the same to installation on motor vehicles having differently located transmissions.

Another object is to provide a mechanism having driving connections protecting the controlled valve against undue strains and readily adjustable to adapt the same to valves of different sizes.

Another object is to provide improved limit means whereby the mechanism is arrested automatically.

Various other objects and advantages of the invention will hereinafter appear.

The accompanying drawings illustrate a preferred embodiment of the invention which will now be described it being understood that the embodiment illustrated is susceptible of various modifications without departing from the scope of the appended claims.

In the drawing,

Figure 1 diagrammatically illustrates the mechanism mounted on a motor vehicle;

Figures 1, 2:
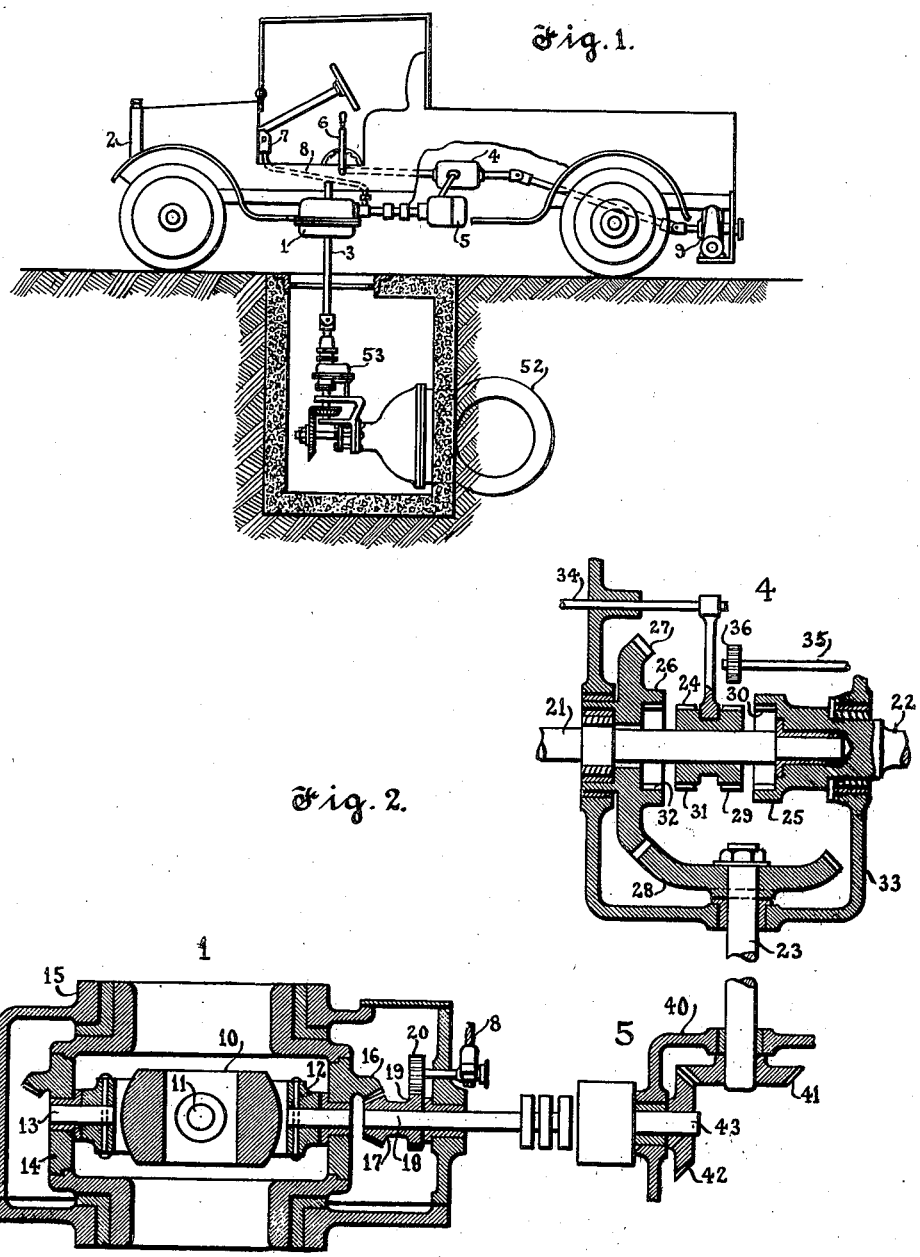
Fig. 2 illustrates more or less diagrammatically several units of the mechanism.

Referring to Fig. 1 the mechanism comprises a key driving unit 1 shown as mounted on the running board of a motor truck 2 and having a removable valve actuating key 3. Also the mechanism comprises a take-off transmission unit 4 and connections including a right angle bevel drive 5 through which the key driving unit may be connected to the engine of the truck through the selective speed change gear transmission of the latter. However, the unit 4 when set to afford engine drive of the unit 1, interrupts the driving connections between driving wheels of the truck and the selective speed change gear transmission of the latter thereby insuring against starting of the truck.

The take-off transmission unit is illustrated as provided with a control lever 6 adjacent the driver's seat and an automatic stopping unit 7 for the mechanism is shown as mounted on the dash, the latter unit being connected to the unit 1 through a flexible driving shaft 8. As will be understood the lever 6 and unit 7 may be mounted in any other preferred locations but in practice it is preferred to arrange both within reach of one occupying a position adjacent the engine control instrumentalities.

It is frequently desired to equip such a truck with a centrifugal pump and such a pump 9 is illustrated as mounted at the rear thereof to be driven through the take-off transmission 4. As will appear the take-off transmission may be and preferably is provided with a shaft to be connected to the engine while the latter is disconnected both from the driving wheels of the vehicle and the key driving unit 1.

Referring to Fig. 2 the key driving unit comprises a key socket 10 pivotally supported on pins 11 within an annular member 12 which in turn is pivotally supported on pins 13 within a revoluble member 14, the pins 11 and 13 being disposed at right angles to afford a universal connection between socket 10 and member 14. Member 14 which for convenience is preferably formed in sections as shown is revolubly supported in a housing 15 and the intermediate section of said member comprises a bevel gear 16 to mesh with a driving pinion 17 fixed to a shaft 18 having a bearing in a side wall of said housing. Thus assuming a valve key to be fitted within socket 10 the same may be rotated in either direction by rotation of shaft 18 in reverse directions selectively and in this connection it is to be noted that the member 14 and housing 15 have key receiving openings on both sides of the socket such openings being of dimensions to permit lateral play of the key upon tilting of the socket. Also it may here be noted that the unit 1 includes a pinion 19 on shaft 18 which meshes with a pinion 20 to provide a drive for the limit mechanism hereinafter described.

The transmission take-off unit 4 to which shaft 18 is connected comprises axially aligned and relatively rotatable shafts 21 and 22 forming elements of the vehicle drive. The shaft 21 is provided for connection to the engine through selective speed change gear transmission of the vehicle and serves when coupled to shaft 22 to drive the vehicle. On the other hand when uncoupled from shaft 22 the shaft 21 is free to operate independently of the vehicle and is employed to drive a shaft 23 connected to shaft 18 of unit 1 as hereinafter set forth. More specifically the shaft 21 has slidingly keyed thereon a double coupling member 24 adapted when shifted in one direction to enter a complementary coupling member 25 provided on shaft 22 and when shifted in a reverse direction to disengage member 25 and enter a complementary coupling member 26 carried by a bevel gear 27 revolubly mounted on shaft 21 and meshing with a bevel gear 28 fixed to shaft 23. While of course the coupling members may be of any preferred design the member 24 is preferably provided with teeth 29 to mesh with internal teeth 30 of member 25 and teeth 31 to mesh with internal teeth 32 of member 26 whereby a positive driving connection may be established between shaft 21 and shaft 22 or shaft 23.

Figure 3:
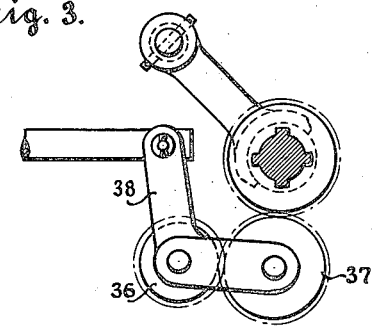
Fig. 3 illustrates diagrammatically certain gears of one unit shown in Fig. 2.

The aforementioned elements of the take-off transmission are preferably enclosed in a suitable housing 33 to be attached to the vehicle frame and affording bearings for the shafts described and for a slide 34 having a fork to engage coupling member 24 for shifting thereof. The slide 34 as will be understood may be connected to lever 6 (Fig. 1) in any preferred manner to afford control to the aforedescribed coupling by said lever while direction control of the shafts 21 and 23 and hence of the key driving unit is afforded by the selective gear transmission of the vehicle. Also the take-off transmission is preferably provided with an additional shaft 35 to drive the pump 9 (Fig. 1) said shaft having fixed thereto a pinion 36 to mesh with a gear 37 (Fig. 3) movable into mesh with the teeth 29 of coupling member 24 when the latter occupies the uncoupling position shown. The gear 37 may be conveniently mounted on a bell crank lever 38 to be moved in an arc concentric with pinion 36 to thereby enable said gear to be meshed with and disengaged from the coupling member 24 at will.

Figure 4:
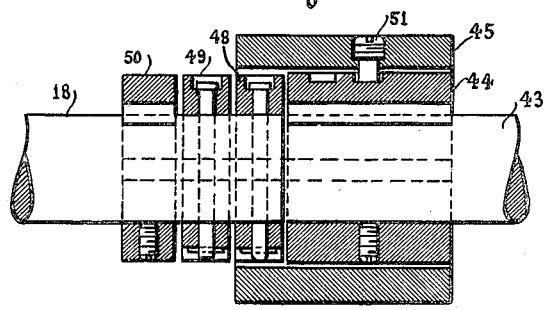
Figs. 4 and 5 illustrate in further detail driving connections between certain units of Fig. 2.
Figure 5:
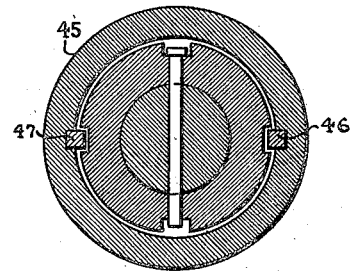

The shafts 18 and 23 are connected through the bevel drive 5 whereby said shafts may be disposed at right angles. More specifically the shaft 23 is extended into a housing 40 which may be conveniently located on the running board of the vehicle as shown in Fig. 1 and said shaft has fixed thereto a bevel gear 41 to mesh with a gear 42 fixed to a shaft 43 adapted to be coupled to shaft 18, preferably as shown in Figs. 4 and 5. As will be apparent such connection of shafts 18 and 23 enables definite positioning of the unit 1 even though the position of the take-off unit longitudinally of the vehicle is varied and it is extremely advantageous to have unit 1 mounted in the position illustrated. Also as will appear it is very advantageous to have the connections now to be described mounted for ready accessibility and the drive described enables location of such connections on the running board between units 1 and 5.

Referring to Figs. 4 and 5 shaft 43 has keyed thereon a collar 44 upon which is mounted an adjustable sleeve 45 having keys 46 and 47 to enter keyways provided in said collar and in collars 48, 49 and 50 secured upon shaft 18. Collars 48 and 49 are secured to shaft 18 only by shear pins while the collar 50 is keyed to said shaft and as will be apparent the sleeve 45 may be interlocked only with collar 48, or collars 48 and 49 or all three collars 48, 49 and 50. Thus assuming appropriate shearing strengths of collars 48 and 49 the former may be employed for operation of relatively small valves to afford protection against undue strains on the latter while both collars may be employed for operation of larger valves while affording adequate protection of the latter. On the other hand if for emergency a positive drive is required the sleeve may be interlocked with all three collars thus throwing the load onto the key of collar 50. As will be apparent the sleeve 45 may be secured in the desired position by any preferred means as for example by a set screw 51. Also as will be apparent the parts of the coupling may be and preferably are provided with clearances lending to the coupling a substantial degree of flexibility to compensate for misalignment of shafts 18 and 43.

In practice where valves are to be operated by a mechanism such as that described it is customary to provide the same with position indicating devices which show the number of revolutions of the operating shaft required for movement from one limit to any position of rest and which further show the total number of revolutions between limits. The valve 52 of Fig. 1 is shown as provided with such an indicating device 53 which may be of the construction disclosed in my copending application Serial No. 349,125 filed January 2, 1920, and where such indicating devices are provided it is manifestly advantageous to provide the mechanism now to be described by means of which the drive of the valve may be stopped automatically upon completion of any predetermined degree of valve operation.

Figure 6:
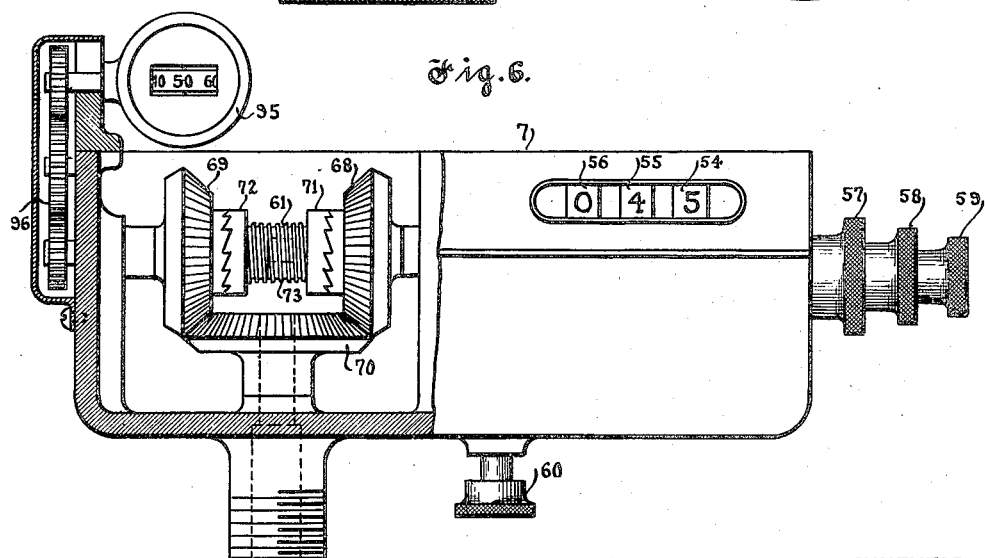
Figs. 6, 7 and 8 illustrate more or less diagrammatically the stopping mechanism.
Figure 7:
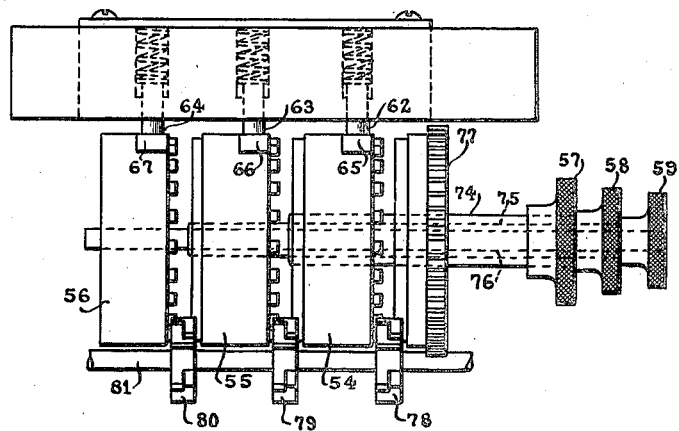
Figure 8:
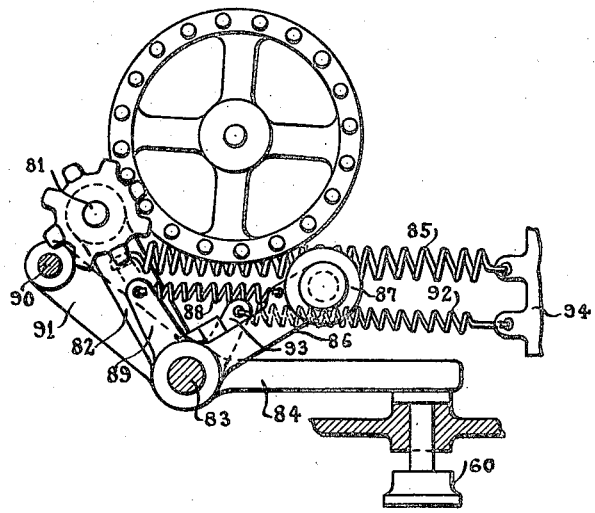

Referring to Figs. 6 to 8 the same illustrate a preferred mechanism for the stopping unit 7 of Fig. 1 which as described is preferably mounted on the dash of the vehicle. This mechanism comprises a counting device of any preferred form shown as including rotatable discs 54, 55 and 56 to be set respectively as desired by knobs 57, 58 and 59 when a releasing knob 60 is depressed. On the other hand the discs when so set are adapted to be progressively returned to their zero positions by a mechanism including a unidirectionally rotatable shaft 61 to be driven by the key driving unit 1 through the flexible shaft 8, Fig. 1, said discs being utilized to terminate the engine ignition when all are returned to their zero positions. As will be understood the driving ratio between unit 1 and the counting discs is such that the latter will count the revolutions of the valve operating member and thus when set to show a given number the same will permit a like number of revolutions of the valve operating member prior to terminating the engine ignition. For control of the engine ignition the discs are provided with contact brushes 62, 63 and 64 respectively which bear thereon and with insulating inserts 65, 66 and 67 respectively with which said contact brushes respectively engage when said discs occupy their zero positions. Accordingly as will be understood said discs if formed of conducting material provide switches which may be utilized in parallel to maintain the engine ignition until all discs are returned to zero position to open the parallel circuits controlled thereby.

The unit 1 being subjected to reverse operations and hence subjecting the flexible shaft 8 to reverse operations it is necessary to provide reversible connections between shaft 8 and the driving shaft 61 of the counting device in order to obtain functioning of the latter for reverse operations of the controlled valve. To this end the shaft 61 is preferably provided with bevel gears 68 and 69 loosely mounted thereon in a spaced relation to be driven in opposite directions by a common drive gear 70 fixed to flexible shaft 8. Thus by coupling gears 68 and 69 selectively to shaft 61 according to the direction of rotation of gear 70 the shaft 61 may be operated unidirectionally and in the proper direction regardless of the direction of valve operation and by means of one-way ratchet clutches 71 and 72 such selection is rendered automatic. The clutches 71 and 72 which are associated with the gears 68 and 69 respectively are provided with ratchet members fixed to said gears and with co-operating ratchet members keyed to shaft 61 but slidable longitudinally thereon against the action of a spring 73 interposed between the latter members. The ratchet faces of the two cluches are relatively reversed and thus when either clutch functions the other slips whereby said clutches function selectively according to the direction of rotation of gear 70 to drive the shaft 61 unidirectionally in the desired direction regardless of the direction of valve operation.

The discs 54, 55 and 56 are preferably mounted on telescoping shafts 74, 75 and 76 respectively (Fig. 7), said shafts having fixed thereto respectively the setting knobs 57, 58 and 59. On the other hand the discs are arranged for operation from the shaft 61 through the medium of a gear member 77 and the usual form of interlocking pinions 78, 79 and 80 affording operation of said discs intermittently as desired, said interlocking pinions being loosely mounted on a common shaft 81. The shaft 81 as exemplified in Fig. 8 is preferably carried by a pair of arms 82 (only one arm being illustrated) which are fixed to a shaft 83 operable by the knob 60 through the medium of a lever 84 to disengage the interlocking pinions from their discs for hand setting of the latter. The arms 82 are biased by a spring 85 to return the interlocking pinions to their normal positions thus requiring retention of the knob during hand setting of the discs.

Also as exemplified in Fig. 8, it is preferred to provide on the shaft 83 a number of levers 86 carrying individual braking wheels 87 for the several discs, said levers being loosely mounted on said shaft and being drawn into braking positions by springs 88 connecting the same with levers 89 fixed to said shaft. As will appear the braking wheels normally disengage the discs but are adapted to be drawn into engagement therewith as described when the knob 60 is pressed to rotate shaft 83 for disengaging the interlocking pinions. Thus the discs are prevented from accidental movement during setting thereof and are more readily stabilized in their selected positons.

Further it is preferred to provide means such for example as that shown in Fig. 8 whereby the interlocking pinions are retained in the established relation during hand setting of the discs. This means comprises a shaft 90 against which the pinions are pressed when disengaged from the discs, said shaft being supported by a pair of arms 91 (only one arm being illustrated) which are loosely supported on the shaft 83 and yieldingly retained in the position shown by a spring 92 connecting an extension 93 of one of said arms to a fixed part 94.

In practice it is desirable to have different valves operated at different predetermined speeds and in some instances to have the same valve operated at different predetermined speeds through different portions of its range. Thus to facilitate the desired speed regulation by the operator the unit 7 is preferably provided with a speed indicator 95, Fig. 6, of any preferred type which is shown as operatively connected to shaft 61 through a suitable gear train 96. Shaft 61 as above set forth is driven directly from the valve driving unit 1 and is driven unidirectionally regardless of the direction of valve operation whereby it serves to operate the speed indicator in synchronism with the valve and always unidirectionally. As will be understood the speed indicator may be designed to indicate the number of revolutions per minute of the valve stem or other operating part, thus enabling the operator to readily effect the desired speed control either by regulating the speed of the engine or by commutating the transmission gears or both.

What I claim as new and desire to secure by Letters Patent is:

1. The combination with a motor vehicle having a take-off transmission, of a valve key driving unit to be subjected to reverse operations by the vehicle engine through reversal of the direction of operation of said take-off transmission, a stopping device associated with the engine and adapted to be operated by said unit to control the engine and driving connections between said device and unit insuring unidirectional operation of the former regardless of reversals of the latter.

2. The combination with a motor vehicle having a take-off transmission, of a valve key driving unit to be subjected to reverse operations by the vehicle engine through reversal of the direction of operation of said take-off transmission, a stopping device associated with the engine and adapted to be operated by said unit to control the engine and driving connections between said device and unit including driven gears, a common driving gear therefor to drive the same in relatively reverse directions and ratchet clutches to connect said device to said driving gear through said driven gears selectively to restrict said device to unidirectional operation regardless of reversals of said driving gear.

3. The combination with valve operating means including a rotatable part and reversible means to drive the same in opposite directions, of a stopping device associated with said reversible driving means, and adapted to be driven by a reversible element of the first mentioned means in synchronism with said rotatable part to limit the latter to a given number of revolutions and driving connections between said device and said element inherently affording unidirectional drive of the former upon operation of the latter in reverse directions.

4. In a valve operating mechanism, the combination with a rotatable valve operating part and reversible driving means therefor, of a device for controlling said driving means to stop the same upon a given number of revolutions of said valve operating part, and driving connections between said device and a reversible element of said driving means including a gear driven by said element, gears driven in relatively reverse directions by said former gear and ratchet clutches between said latter gears and said device to restrict said device to operation by said latter gears selectively according to the direction of rotation of said former gear.

In witness whereof, I have hereunto subscribed my name.

PETER P. DEAN.